# 2,948,592

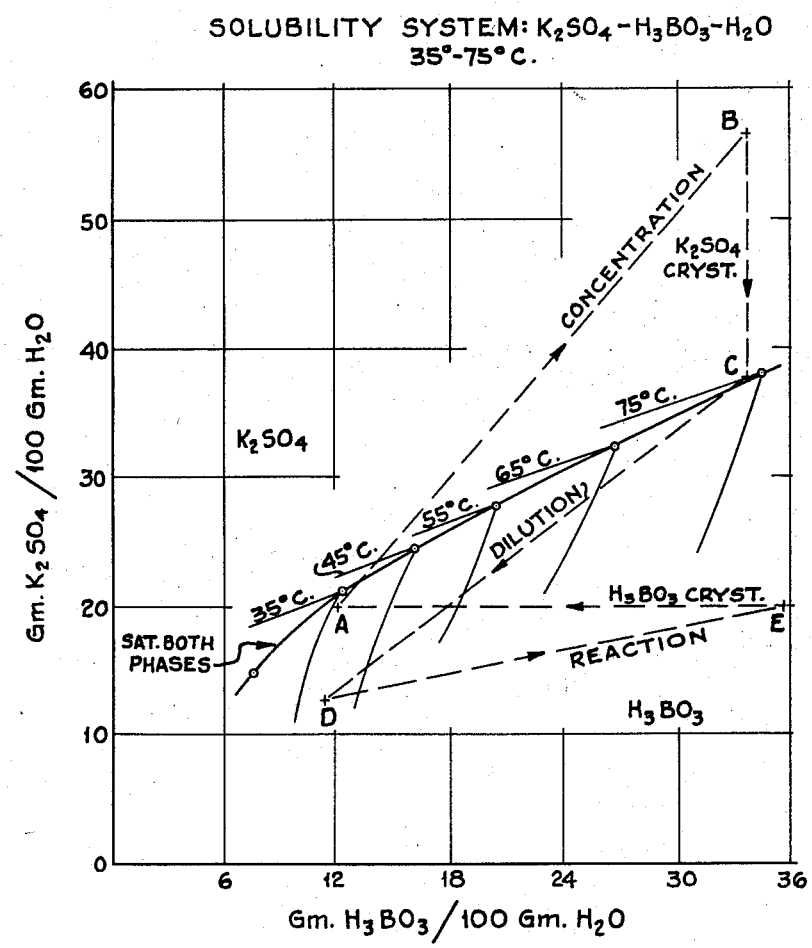
FIG_1

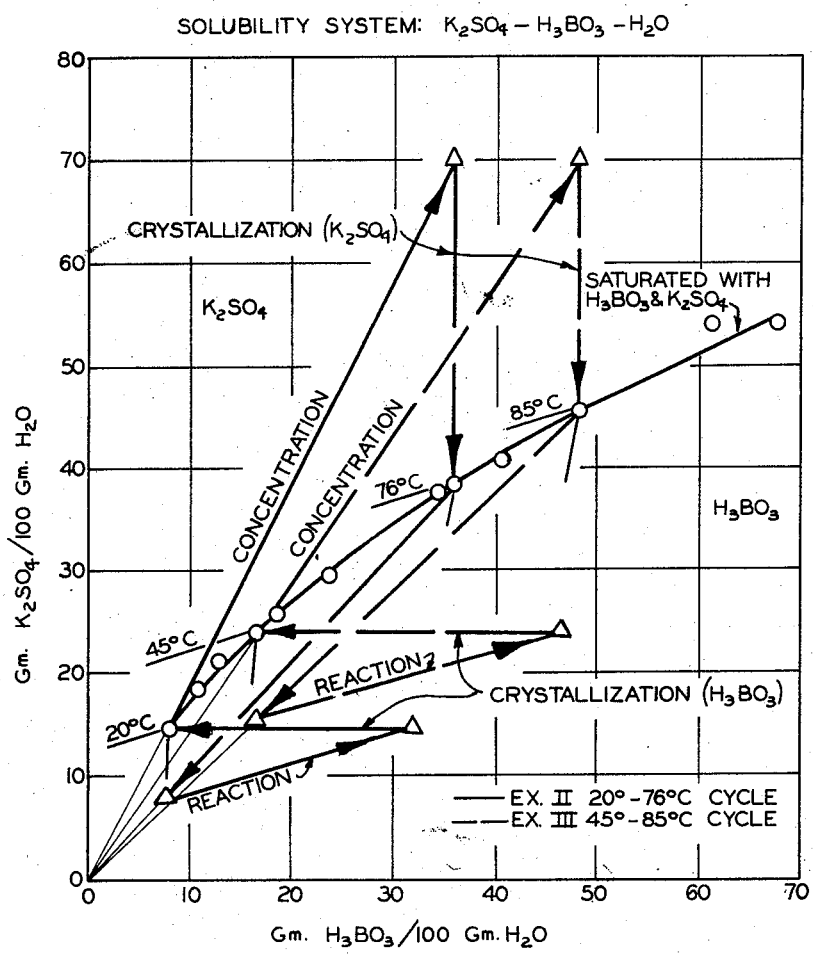
FIG_2

PROCESS FOR PRODUCING PURE BORIC ACID AND POTASSIUM SULFATE

Frank H. May, Whittier, Calif., assignor to American Potash & Chemical Corporation, a corporation of Delaware Filed Feb. 16, 1959, Ser. No. 793,630

6 Claims. (Cl. 23—149)

This invention relates to a cyclic process for the manufacture of boric acid and potassium sulfate from potassium borate, $K_2B_{10}O_{16} \cdot 8H_2O$, and sulfuric acid substantially in accordance with the reaction:

$$K_2B_{10}O_{16} \cdot 8H_2O + 6H_2O + H_2SO_4 \rightarrow K_2SO_4 + 10H_3BO_3$$

The general object of the present invention is to provide a process for producing pure boric acid and potassium sulfate from a potassium borate and sulfuric acid in a continuous, cyclic operation. More specifically, the object of this invention is to provide a process for the use of potassium pentaborate as an economic raw material for the above process.

The general advantage of using a potassium borate as raw material is the relatively greater value of the potassium sulfate produced, as compared to the sodium sulfate by-product produced when a sodium borate is used as a raw material. The particular advantage of using potassium pentaborate is due to the considerably greater yield of boric acid obtained per unit of sulfuric acid required. Potassium pentaborate can readily be prepared as a relatively cheap material, for example as described in my Patent No. 2,395,566 or as an intermediate, as shown in my Patent No. 2,395,564, and can therefore be considered as a readily available raw material for the present process.

So far as the available literature is concerned, there is no published information describing a process for producing potassium sulfate and boric acid from potassium borates and sulfuric acid. Solubilities in the system $K_2SO_4$—$H_3BO_3$—$H_2O$ do not permit establishment of a simple heating and cooling cycle for the alternate separation of boric acid and potassium sulfate.

In the drawings:

Figure 1 is a graphical representation of the cyclic process of this invention using a preferred set of temperature conditions.

Figure 2 is a graphical representation of two additional cyclic processes using temperature conditions differing somewhat from those of the process of Figure 1.

The chemistry of the process is most easily described by referring to the accompanying drawing designated Figure 1 where the sequence of operations is shown graphically starting with point A and following the arrows through successive points to E and back to point A to complete the cycle.

The process of Figure 1 is based upon starting with a 35° C. boric acid filtrate having the composition of point A on the diagram. This liquor serves as feed to an evaporator where it is concentrated from point A along a line (labeled "Concentration") through the zero axis to point B. The concentrated liquor is next cooled to 75° C. to crystallize a crop of $K_2SO_4$ and yield a mother liquor of the composition represented by point C. The potassium sulfate solids are separated and the mother liquor is next diluted with water to a point along the line from point C extended through the zero axis to point D. Controlled amounts of $K_2B_{10}O_{16} \cdot 8H_2O$ and sulfuric acid in stoichiometric quantities are then added to this diluted liquor to produce a liquor of composition E. This reaction solution is then cooled to 35° C. to crystallize a crop of boric acid and produce a mother liquor having the composition of point A; the starting point for the process. The boric acid solids are separated by filtering and the filtrate sent to the evaporator.

The following is offered as a specific example of the method of this invention, it being understood that this example is to be construed as illustrative only:

EXAMPLE I

To a solution of 451 grams of $K_2SO_4$ and 408 grams of $H_3BO_3$ in 3542 grams $H_2O$, 770 grams of $$K_2B_{10}O_{16} \cdot 8H_2O$$

and 128.8 grams $H_2SO_4$ (72.5 cc. of 1.842 sp. gr. $H_2SO_4$) were added with constant agitation. The resulting reaction mass was heated to 90° C., at which temperature complete solution was obtained. The hot solution was cooled with agitation to 35° C. and a crop of boric acid centrifuged out, washed with a small amount of water and air dried.

The following analyses were obtained on the undiluted filtrate (35° C.) and on the air dried boric acid product:

35° C. Filtrate (point A)

|  | Gms. salt/100 g. $H_2O$ |
|---|---|
| $K_2SO_4$ | 20.01 |
| $H_3BO_3$ | 12.42 |

$H_3BO_3$ product

|  | Wt. percent |
|---|---|
| $H_3BO_3$ | 99.7 |
| K | Nil |
| $SO_4$ | Trace |
| $H_2O$ (diff.) | 0.3 |

A quantity of boric acid filtrate (4300 gms.) was combined with the cake wash (550 gms.) and then concentrated by evaporation at atmospheric pressure. About 2480 grams of water were removed. The agitated concentrated liquor was then cooled to about 75° C. A plug pipette sample of clear filtrate was taken at 76° C. and the following analysis was obtained:

76° C. $K_2SO_4$ crystallizer liquor (point C)

|  | Gms. salt/100 g. $H_2O$ |
|---|---|
| $K_2SO_4$ | 36.6 |
| $H_3BO_3$ | 35.7 |

The hot concentrated liquor (76° C.) was decanted from the $K_2SO_4$ solids and saved for recycling purposes. The potassium sulfate solids were then agitated in about 500 cc. of boric acid filtrate maintained at about 35° C. The solids were then centrifuged and washed with water saturated with $K_2SO_4$ at 35° C. The washed wet solids were dried at 100° C.

Analysis of dry $K_2SO_4$ solids

|  | Wt. percent |
|---|---|
| $K_2SO_4$ | 99.95 |
| $H_3BO_3$ | 0.05 |

As aforestated, Figure 2 relates to two additional runs using temperatures which vary considerably from these described in the example above. Although there are several ways in which a particular cycle may be set up, the most direct is to set the boric acid crystallizer temperature and the boric acid slurry concentration. After these factors have been set, the solubilities of the system establish the complete cycle. In the examples which follow, the two boric acid slurries contained 24 and 30 grams of solid per 100 grams of water in the respective boric acid mother liquors.

As in the example above, the amount of water added as dilution in the equilibrium cycle was equal to that evaporated exclusive of that required by the equation set out at the beginning of the specification less the dilution from cakewash, etc. The corrected dilution is adjusted to yield a boric acid filtrate slightly under saturated with respect to potassium sulfate. The concentration percycle was based upon the composition of the $K_2SO_4$ filtrate as determined by extending a line on the graph of Figure 2 through the diluted filtrate composition and the zero axis to the intersection of the solubility curve.

The two additional examples which follow, as well as that preceding example, are all based upon operation at points near saturation with respect to both potassium sulfate and boric acid. However, it is obvious that the process may be operated at points along an isotherm somewhat removed from saturation with respect to one phase without departing from the basic process. For example, by increasing the dilution and corresponding concentration, and with proper control of operating temperatures, the process can be controlled to crystallize boric acid from a solution which is considerably undersaturated with respect to potassium sulfate and to crystallize potassium sulfate from a solution which is considerably undersaturated with respect to boric acid. However, the preferred process involves operating with saturated conditions and the two examples which follow are based upon operation of the crystallization steps of the process at points close to saturation with respect to the phase to be retained in solution in a manner similar to the process of Example I.

EXAMPLE II

Basis:
(1) Boric acid crystallization temperature=20° C.
(2) Boric acid crystallizer slurry to contain 24 grams $H_3BO_3$ solids/100 grams $H_2O$.
(3) $K_2B_{10}O_{16} \cdot 8H_2O$ borate raw material.

Composition of 20° C. liquor saturated with $H_3BO_3$ and $K_2SO_4$ ($H_3BO_3$ filtrate):

20° C. $H_3BO_3$ M.L.:
$K_2SO_4$ ------------------------------- 14.8.
$H_3BO_3$ ------------------------------- 7.6.
$H_2O$ --------------------------------- 100.0.

20° C. $H_3BO_3$ crystallizer slurry:
$K_2SO_4$ ------------ 14.8.
$H_3BO_3$ ------------ 7.6+24 solids=31.6 total.
$H_2O$ --------------- 100.0.

Reaction materials required/24 units of $H_3BO_3$ produced:

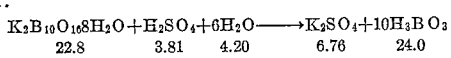
$K_2B_{10}O_{16}8H_2O + H_2SO_4 + 6H_2O \longrightarrow K_2SO_4 + 10H_3BO_3$
22.8            3.81       4.20              6.76        24.0

The dilute $K_2SO_4$ filtrate (before addition of reaction materials).

$K_2SO_4$ --------------------------- 14.8−6.76=8.04.
$H_3BO_3$ --------------------------- 7.6.
$H_2O$ ----------------------------- 100.0.

A straight line drawn through the plot of the diluted $K_2SO_4$ filtrate and the zero axis on the solubility diagram crosses the solubility curve representing saturation with $H_3BO_3$ and $K_2SO_4$ at a point corresponding approximately to the solution composition of the $K_2SO_4$ crystallizer. The composition of this point in grams/100 grams $H_2O$ is as follows; representing saturation at approximately 76° C.

$K_2SO_4$ ----------------------------------- 38.1
$H_3BO_3$ ----------------------------------- 36.0
$H_2O$ ------------------------------------- 100.0

The concentrated liquor then, as derived from concentration of the boric acid filtrate, must contain (7.6/36.0)(100)=21.11 units of water or 100−21.11 =78.89 grams of water are evaporated for every 100 grams of water which was present in the boric acid filtrate.

The concentrated liquor resulting from concentration of this amount of boric acid filtrate is equivalent to:

| Boric Acid Filtrate | | Weight | Conc. $K_2SO_4$ Liquor |
| --- | --- | --- | --- |
| | | | Liq. Comp. gm./100 gm. $H_2O$ |
| $K_2SO_4$ | 14.8 | 14.8 | 70.1 |
| $H_3BO_3$ | 7.6→ | 7.6 | 36.0 |
| $H_2O$ | 100.0−78.89 evap. | 21.11 | 100.0 |

=3.29 units of water evaporated/unit of $H_3BO_3$ produced.

Cooling this liquor to 76° C. (approx.).

76° C. $K_2SO_4$ crystallizer liquor
WEIGHT

| | Liq. | Solids | Liq. Comp. gm./100 gm. $H_2O$ |
| --- | --- | --- | --- |
| $K_2SO_4$ | 8.04 | 6.76 | 38.1 |
| $H_3BO_3$ | 7.6 | | 36.0 |
| $H_2O$ | 21.11 | | 100.0 |

This slurry is filtered and the filtrate is diluted with 78.89 units of water and a second cycle is carried out by adding reaction materials to the diluted liquor as before.

EXAMPLE III

In this example assume as a basis:
(1) Boric acid crystallizer temperature=45° C.
(2) Boric acid crystallizer slurry to contain 30 grams $H_3BO_3$ solids/100 grams $H_2O$ in boric acid filtrate.
(3) $K_2B_{10}O_{16} \cdot 8H_2O$ raw material.

Following exactly the same procedure as in Example II, the liquor compositions, reaction quantities of raw materials and evaporated water are as follows:

Boric acid crystallizer
WEIGHT AND COMPOSITION

| 45° C. Boric Acid Filtrate | | Liq. Wt. & Comp. | | Solids |
| --- | --- | --- | --- | --- |
| $K_2SO_4$ | 24.0 | $K_2SO_4$ | 24.0 | |
| $H_3BO_3$ | 16.5 | $H_3BO_3$ | 16.5 | 30.0 |
| $H_2O$ | 100.0 | $H_2O$ | 100.0 | |
| Total | 140.5 | | | |

Concentrated potassium sulfate liquor

| | Weight | Comp. |
| --- | --- | --- |
| $K_2SO_4$ | 24.0 | 70.26 |
| $H_3BO_3$ | 16.5 | 48.3 |
| $H_2O$ | 34.16 | 100.0 |

Potassium sulfate crystallizer (85° C. approx.)
WEIGHT

| | Liq. | Solids | Liq. Comp. |
| --- | --- | --- | --- |
| $K_2SO_4$ | 15.55 | 8.45 | 45.5 |
| $H_3BO_3$ | 16.5 | | 48.3 |
| $H_2O$ | 34.16 | | 100.0 |

Dilute potassium sulfate filtrate
WEIGHT AND COMP.

$K_2SO_4$ --------------------------------- 15.55
$H_3BO_3$ --------------------------------- 16.5
$H_2O$ ----------------------------------- 100.0

Raw material:

$$K_2B_{10}O_{16} \cdot 8H_2O + H_2SO_4 + 6H_2O \longrightarrow K_2SO_4 + 10H_3BO_3$$
$$28.45 \qquad 4.76 \quad 5.24 \qquad 8.45 \quad 30.0$$

$H_2O$ evap.$=65.84=2.2$ units/unit of $H_3BO_3$
=dilution water added to $K_2SO_4$ filtrate.

The values of each of the foregoing two examples were plotted on a graph and constitute Figure 2.

While potassium pentaborate was used as a raw material in the above discussed specific example, to those experienced in the art it would be obvious that other potassium borates, such as tetraborate, preparations of which are described in my Patents Nos. 2,455,595, 2,395,567 and 2,776,186, can be used as raw materials instead of the pentaborate substantially in accordance with the following equation:

$$K_2B_4O_7 \cdot 4H_2O + H_2SO_4 \rightarrow K_2SO_4 + 4H_3BO_3$$

In such a case, the only important difference in the overall process would be the ratios of $K_2SO_4$ and $H_3BO_3$ produced.

The examples preceding represent the preferred operating conditions, but a certain amount of variation from the temperature conditions described is possible. For example, the boric acid crystallizer can be operated somewhat below and somewhat above the 20–45° C. actually shown on the examples. The potassium sulfate crystallizer may be operated somewhat below the 75° C. shown in the example and somewhat above the 85° C. shown. The range of between about 70° C. and somewhat in excess of about 95° C. are suitable, although a temperature approaching 100° C. is difficult to handle (at atmospheric pressure) for obvious reasons. However, theoretically there is no reason why a temperature approaching 100° C. might not be used. Hence, in the claims which follow it is to be borne in mind that variations from the temperatures are possible with results only somewhat impaired from those disclosed here. The process is limited only by economic factors, e.g., the relative cost of heating and cooling as against the yield obtained.

Obviously many modifications and variations of the invention as hereinbefore set forth may be made without departing from the spirit and scope thereof, and therefore only such limitations should be imposed as are indicated in the appended claims.

This application is a continuation-in-part of my application Serial No. 631,858, filed December 31, 1956, for Process for Producing Pure Boric Acid and Potassium Sulfate, now abandoned.

I claim:

1. In a process for the preparation of boric acid wherein a potassium borate and sulfuric acid are added to a recycled aqueous solution containing dissolved boric acid and potassium sulfate and allowed to react to produce boric acid and potassium sulfate in quantities sufficient to precipitate boric acid at a temperature of about 35° C. while substantially all of said potassium sulfate remains in solution and wherein said solution is heated to a temperature sufficiently in excess of said 35° C. to dissolve all of said potassium sulfate and said boric acid and said solution is thereafter adjusted to about said 35° C. temperature to precipitate a crop of boric acid crystals about equivalent to the quantity of boric acid introduced by said reaction without precipitating potassium sulfate and said boric acid is separated therefrom, the improvements comprising: heating the mother liquor remaining after the separation therefrom of said boric acid crystals to a temperature in excess of about 75° C. to evaporate at least about one-half of said water therefrom to exceed the solubility of said potassium sulfate with respect to said liquor at a temperature of about 75° C.; thereafter cooling said mother liquor to about said 75° C. temperature to precipitate a crop of potassium sulfate crystals about equivalent to the quantity of potassium sulfate introduced by said reaction; separating said potassium sulfate; thereafter adding water to said mother liquor in an amount sufficient to replace that lost during said process, wherein to form an aqueous solution of a volume substantially equal to the said recycled aqueous solution initially present; and recycling the aqueous solution so formed in said process.

2. The process of claim 1 wherein said potassium borate is potassium pentaborate and wherein said sulfuric acid and said potassium pentaborate are proportioned to provide stoichiometric quantities of each to satisfy the equation:

$$K_2B_{10}O_{16} \cdot 8H_2O + 6H_2O + H_2SO_4 \rightarrow K_2SO_4 + 10H_3BO_3$$

3. In a process for the preparation of boric acid wherein a potassium borate and sulfuric acid are added to a recycled aqueous solution containing dissolved boric acid and potassium sulfate and allowed to react to produce boric acid and potassium sulfate in quantities sufficient to precipitate boric acid at a predetermined temperature of between about 20° C. and 45° C. while substantially all of said potassium sulfate remains in solution and wherein said solution is heated to a temperature sufficiently in excess of said predetermined temperature of between about 20° C. and 45° C. to dissolve all of said potassium sulfate and said boric acid and said solution is thereafter adjusted to about said predetermined temperature of between about 20° C. and 45° C. to precipitate a crop of boric acid crystals about equivalent to the quantity of boric acid introduced by said reaction without precipitating potassium sulfate and said boric acid is separated therefrom, the improvements comprising: heating the mother liquor remaining after the separation therefrom of said boric acid crystals to a temperature in excess of a predetermined temperature of between about 70° C. and 95° C. to evaporate at least about one-half of said water therefrom to exceed the solubility of said potassium sulfate with respect to said liquor at said predetermined temperature of between about 70° C. and 95° C.; thereafter cooling said mother liquor to said predetermined temperature of between about 70° C. and 95° C. to precipitate a crop of potassium sulfate crystals about equivalent to the quantity of potassium sulfate introduced by said reaction; separating said potassium sulfate; thereafter adding water to said mother liquor in an amount sufficient to replace that lost during said process, whereby to form an aqueous solution of a volume substantially equal to the said recycled aqueous solution initially present; and recycling the aqueous solution so formed in said process.

4. The process of claim 3 wherein said potassium borate is potassium pentaborate and wherein said sulfuric acid and said potassium pentaborate are proportioned to provide stoichiometric quantities of each to satisfy the equation:

$$K_2B_{10}O_{16} \cdot 8H_2O + 6H_2O + H_2SO_4 \rightarrow K_2SO_4 + 10H_3BO_3$$

5. The process of claim 3 wherein said first predetermined temperature is about 20° C. and wherein said second predetermined temperature is about 76° C.

6. The process of claim 3 wherein said first predetermined temperature is about 45° C. and said second predetermined temperature is about 85° C.

References Cited in the file of this patent

UNITED STATES PATENTS

| | | |
|---|---|---|
| 1,888,391 | Newman | Nov. 22, 1932 |
| 2,014,009 | Burke | Jan. 4, 1938 |
| 2,637,626 | Taylor | May 5, 1953 |